United States Patent [19]

Morishita

[11] Patent Number: 4,580,072
[45] Date of Patent: Apr. 1, 1986

[54] STATOR FOR MAGNET-TYPE ROTATING MACHINES

[75] Inventor: Akira Morishita, Himeji, Japan

[73] Assignee: Mitsubishi Denki Kabushiki Kaisha, Tokyo, Japan

[21] Appl. No.: 668,391

[22] Filed: Nov. 5, 1984

[30] Foreign Application Priority Data

Nov. 5, 1983 [JP] Japan .................. 58-171438[U]

[51] Int. Cl.⁴ ............................................ H02K 21/26
[52] U.S. Cl. ..................................... 310/154; 310/42
[58] Field of Search ................. 310/42, 154, 152, 254, 310/239

[56] References Cited

U.S. PATENT DOCUMENTS

| 2,971,107 | 2/1961 | Jin . | |
|---|---|---|---|
| 3,258,622 | 6/1966 | Gillespie | 310/154 |
| 3,631,277 | 12/1971 | Ferdig | 310/154 |
| 3,772,546 | 11/1973 | Means | 310/154 |
| 3,790,830 | 2/1974 | Bonfiglio | 310/154 X |
| 3,939,371 | 2/1976 | Murakami | 310/154 |

FOREIGN PATENT DOCUMENTS

| 0058234 | 8/1982 | European Pat. Off. . |
|---|---|---|
| 1180041 | 10/1964 | Fed. Rep. of Germany . |
| 7021061 | 6/1970 | Fed. Rep. of Germany . |
| 2005194 | 8/1971 | Fed. Rep. of Germany . |
| 3119782 | 12/1982 | Fed. Rep. of Germany . |
| 5631364 | 8/1979 | Japan . |
| 57-153559 | 9/1982 | Japan . |
| 57-159389 | 10/1982 | Japan . |
| 2013414 | 8/1979 | United Kingdom . |

Primary Examiner—Donovan F. Duggan
Attorney, Agent, or Firm—Oblon, Fisher, Spivak, McClelland & Maier

[57] ABSTRACT

A stator for magnet-type rotating machines comprises projections formed in the inner circumferential surface of a fixed frame in the circumferential direction at a predetermined distance. Position determining pieces, each having elasticity and engaging parts, are fitted to the projections. Permanent magnets are secured between the position determining pieces in such a manner that the raised portions of the position determining pieces are in contact with end surfaces extending in the radial direction of the permanent magnets and the engaging parts are in contact with end surfaces in the circumferential direction of the permanent magnets to effect determination of position of the same.

10 Claims, 10 Drawing Figures

STATOR FOR MAGNET-TYPE ROTATING MACHINES

The present invention relates to an improvement in a stator for magnet-type rotating machines in which permanent magnets are used as field magnetic poles.

There has been proposed to use permanent magnets as field magnetic poles for a stator of a rotating machine such as a generator, a motor and so on.

FIGS. 1 to 3 show a conventional stator for a magnet-type rotating machine disclosed, for instance, in Japanese Examined Utility Model Publication No. 44406/1974. In the Figures, a yoke 2 is provided as a cylindrical fixing frame for forming an external magnetic circuit. The yoke 2 has an annular projection 2a which inwardly projects from the inner circumferential surface and the pair of magnets 1 in a circular arc form is held inside the yoke 2 opposing each other. Position determining pieces 3 each being formed into a generally U-shape in cross section have, at both sides, side walls 3a which are slightly opened in the circumferential direction. Each of the position determining pieces 3 is forcibly put between the end parts of the magnets which are arranged adjacent to each other in the circumferential direction, whereby both side walls 3a extending in the circumferential direction push the magnets 1 to bring them in close-contact with the inner circumferential surface of the yoke 2. An axially projecting part 3b of each of the position determining pieces 3 projects in the axial direction from an end surface 1a of the magnet 1 and has a width larger than a clearance formed between the magnets 1. The axially projecting part 3b has end surfaces 3c, 3d which are parallel each other at the front end side and at the side opposing the front end. The front end side surface 3c is in close-contact with the projection 2a of the yoke 2 and the end surface 3d formed at the position opposing the front end is in close-contact with the end surface 1a of the magnet 1. The magnets 1, the yoke 2 and the position determining pieces 3 constitute a stator.

The length of the projecting part 3b of each of the position determining pieces 3 along the axial direction is selected so that the magnets 1 and a rotor 6 shown by two-dotted chain line have a proper relative positional relationship.

In the magnet-type rotating machine having the construction as above-mentioned, relative position between the magnets 1 and the rotor 6 is determined depending on the length of the projecting part 3b extending in the axial direction from each of the position determining pieces 3. Accordingly, a rotating machine having identical characteristic can be obtained by selecting the length of the magnets 1 in the axial direction so that effective magnetic flux of the magnets is identical even though two kinds of the magnets 1 having different magnetic characteristic are used and by adjusting the length of the projecting part 3b extending in the axial direction of the position determining piece. Conversely, even by using the magnets 1 having identical magnetic characteristic, a rotating machine having different characteristic can be obtained by changing the length of the magnets 1 in the axial direction and by changing effective magnetic flux by determining the length of the projecting part extending in the axial direction from the position determining piece 3b depeding on the length of the magnet 1.

In the conventional magnet-type rotating machines, the magnets 1 are fitted to the inner circumferential surface of the yoke 2 only by utilizing elastic force acting outwardly on the side walls 3a of the position determining pieces 3. Therefore, accuracy in determining position of the magnets 1 is low and magnetic characteristic of a rotating machine disadvantageously changes by variation of effective magnetic flux due to displacement of the magnets during the operation.

It is an object of the present invention to provide a stator for magnet-type rotating machines enabling to increase accuracy in placing permanent magnets at proper positions.

It is another object of the present invention to provide a stator for magnet-type rotating machines without causing change in magnetic characteristic due to displacement of the permanent magnets during the operation of the rotating machine.

It is still another object of the present invention to provide a stator for magnet-type rotating machines which allows easy fitting of the permanent magnets.

The foregoing and the other objects of the present invention have been attained by providing a stator for magnet-type rotating machines which comprises a cylindrical fixed frame having the inner circumferential surface in which projections are formed at a predetermined distance in the circumferential direction, a plurality of permanent magnets fitted between said projections in the inner circumferential surface of the fixed frame, and position determining pieces each of which has through holes engaged with the projections of the fixed frame; raised portions having elasticity to be in contact with end surfaces extending in the radial direction of the permanent magnets to determine position in the radial direction of the same and engaging parts being in contact with end surfaces in the axial direction of the permanent magnets to determine position in the axial direction of the same.

A more complete appreciation of the invention and many of the attendant advantages thereof will be readily obtained as the same becomes better understood by reference to the following detailed description when considered in connection with the accompanying drawings, wherein.

Figure 1:
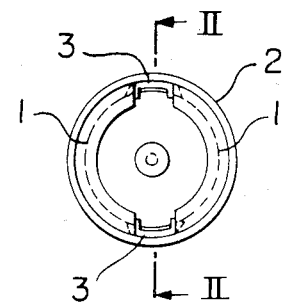
FIG. 1 is a front view of a conventional stator for rotating machines.
Figure 2:
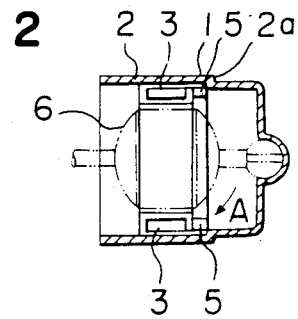
FIG. 2 is a longitudinal cross-sectional view in FIG. 1.
Figure 3:
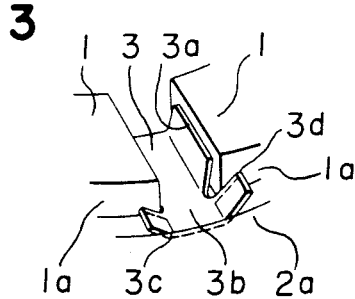
FIG. 3 is a perspective view viewed from the arrow mark of A.
Figure 4:
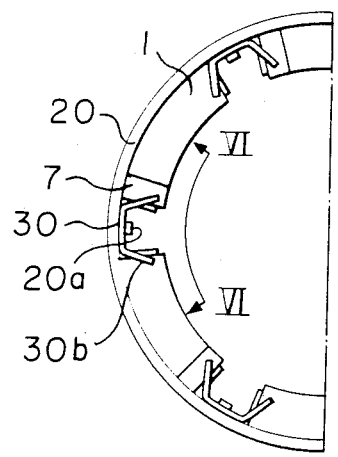
FIG. 4 is a front view of a half portion of an embodiment of the stator for magnet-type rotating machines according to the present invention.
Figure 5:
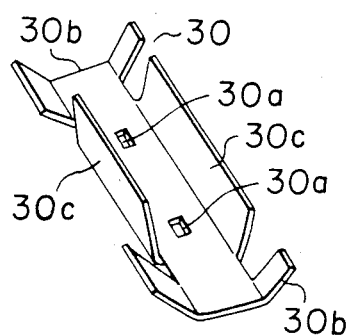
FIG. 5 is a perspective view of a position determining pieces used for the present invention.
Figure 6:
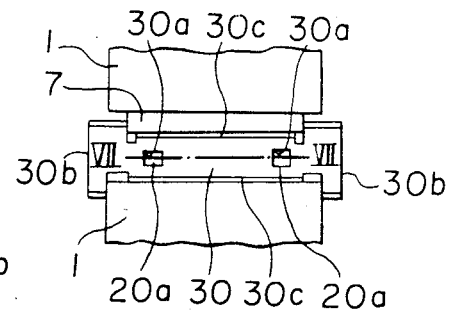
FIG. 6 is a developed view in view of the line VI—VI in FIG. 4.
Figure 7:
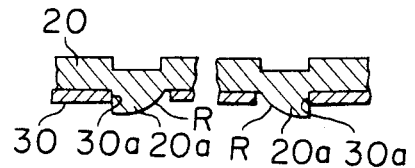
FIG. 7 is an enlarged cross-sectional view of an important part taken along the line VII—VII in FIG. 6.

An embodiment of the present invention will be described with reference to FIGS. 4 to 7. In the Figures, a yoke 20 of a cylindrical fixed frame has no annular stepped projection 2a unlike the conventional yoke 2. In the inner surface of the yoke 20, two rows of projections 20a are formed in the circumferential direction at a fixed distance. Position determining pieces 30 are formed into a U-shape in cross section by pressing steel plate as a plate-like elastic material. Through holes 30a are formed in the bottom part of the position determining pieces 30. Each of the position determining pieces 30 is fitted to the inner surface of the yoke 20 by fitting the through holes 30a in the projections 20a formed in the inner surface of the yoke 20. Engaging parts 30b are formed at both ends in the axial direction of each of the position determining pieces 30 so that a distance between the engaging parts is slightly greater than the lengths of auxiliary poles 7 and the magnets in the axial direction, the engaging parts having portions extending toward the outside with respect to the circumferential direction to perform determination of position of the magnets 1 in the axial direction. Raised portions 30c formed in a U-shape in each of the position determining pieces 30 have a length in the axial direction slightly smaller than the length of the magnets 1. The raised portions are in contact with end surfaces extending in the radial direction of the magnet 1 and the auxiliary pole 7 to determine the position of the magnets 1 in the circumferential direction while they press the magnets 1 to the inner surface of the fixed frame by the action of elastic force. The auxiliary poles 7 formed of soft iron strip are firmly connected to the inner surface of the yoke 2 by electric resistance welding method. Each of the auxiliary poles 7 is firmly attached to each of the magnets 1 at the side of increasing magnetic flux (magnetic flux for armature reaction) which is generated by a rotor (not shown) placed in a space inside the magnets 1 in a freely rotatable manner. The other construction of the magnet type rotating electric machine is the same as the conventional one and therefore the description is omitted.

With the position determining pieces 30, attachment of the magnets 1 on the inner surface of the yoke can be easily and accurately done with respect to a position in the circumferential direction of the magnets 1 because the position determining pieces 30 are previously fitted to the inner surface of the yoke 20. Further, both end surfaces of the magnets 1 and the auxiliary poles 7 in the axial direction are in contact with the engaging parts 30b formed at both ends in the axial direction of the position determining pieces 30. Accordingly, determination of position of the magnets in the axial direction can be easy and accuracy in determining the position is increased. In addition, displacement of the magnets 1 during operation is avoided and accordingly, characteristic of a rotating machine does not change. Furthermore, the magnets 1 are attached to the inner surface of the yoke 2 by utilizing elastic force of the position determining pieces 30 whereby operations for attaching the magnets are easy.

The projections 20a each being formed with a curved portion at one side facilitate fitting of the position determining pieces 30 and provision of a pair of projections blocks movement of the position determining pieces 30 in the axial direction.

Figure 8:
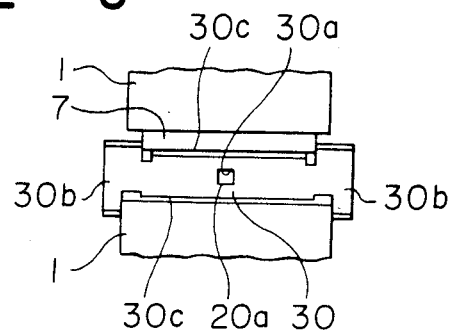
FIG. 8 is a developed view of a part of the stator as another embodiment of the present invention.
Figure 9:
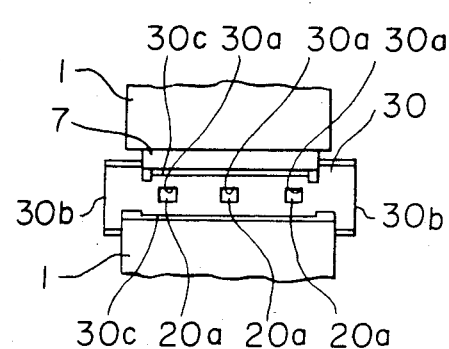
FIG. 9 is a developed view of a part of the stator as still another embodiment of the present invention.
Figure 10:
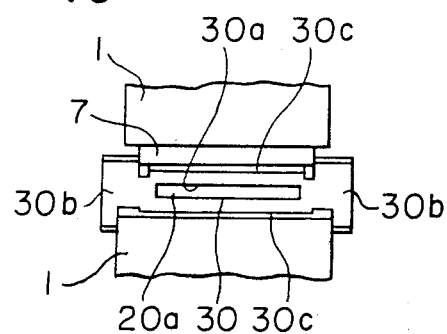
FIG. 10 is a developed view of a part of the stator as separate embodiment of the present invention.

In the embodiment as above-mentioned, the steel plate is used for the position determining pieces 30. However, other elastic material can be used instead of the steel plate. Fixing measures such as an adhesive, spot welding may be utilized in addition to the fixing measure such that the magnets 1 are attached to the inner surface of the yoke 20 by elastic force of the position determining pieces 30. Furthermore, the projections 20a may be formed in a single row as shown in FIG. 8 or three rows as shown in FIG. 9 or may be a continuous projection in the axial direction as shown in FIG. 10.

As described above, in accordance with the present invention, there is provided a magnet type rotating electric machine capable of facilitating fitting of permanent magnets, increasing accuracy in determination of position and providing a stable characteristic even in operation of the rotating electric machine by constructing it in such a manner that projections are formed in the inner circumferential surface of a fixed frame at a fixed interval in the circumferential direction of the surface, position determining pieces are fitted to the projections so that the position determining pieces are fixed to the inner surface of the fixed frame and permanent magnets are positioned between the position determining pieces.

I claim:
1. A stator for magnet-type rotating machines, said stator comprising:
 (a) a fixed frame having a cylindrical inner surface in which at least one array of circumferentially spaced, inwardly directed projections are formed;
 (b) a plurality of position determining pieces mounted in a circumferentially spaced array on the cylindrical inside surface of said fixed frame, each one of said plurality of position determining pieces being generally u-shaped in axial cross section and comprising:
  (i) a generally rectangular bottom part shaped to conform to the cylindrical inside surface of said fixed frame such that the long sides of said generally rectangular bottom part are parallel to the axis of the cylindrical inner surface of said fixed frame, said generally rectangular bottom part having at least one through hole sized, shaped, and positioned to receive a corresponding one of said circumferentially spaced, inwardly directed projections and to hold said one of said plurality of position determining pieces in position on the cylindrical inside surface of said fixed frame;
  (ii) an engaging part formed at each axial end of said generally rectangular bottom parts, each of said engaging parts comprising an axial extension of said generally rectangular bottom part, a first tab extending radially inwardly and in a first circumferential direction from a first circumferential edge of each of said axial extensions, and a second, larger tab extending radially inwardly and in the opposite circumferential direction from a second circumferential edge of each of said axial extensions;
  (iii) a first raised portion extending radially inwardly and in the first circumferential direction from a first circumferential edge of said generally rectangular bottom portion; and
  (iv) a second raised portion extending radially inwardly and in the opposite circumferential direction from a second circumferential edge of said generally rectangular bottom portion;
 (c) a plurality of auxiliary poles, each one of said auxiliary poles being held axially between two associated ones of said first tabs on an associated one of said engaging parts and being contacted circumferentially and resiliently by an associated one of said first raised portions; and (d) a plurality of generally rectangular permanent magnets shaped to conform to the cylindrical inside surface of said fixed frame, each one of said generally rectangular permanent magnets being held axially between two associated ones of said second tabs on an associated one of said engaging parts, being contacted circumferentially and resiliently along one of its long sides by an associated one of said second raised portions, and being contacted circumferentially along the other one of its long sides by an associated one of said plurality of auxiliary poles.

2. A stator as recited claim 1 wherein said projections are uniformly spaced in the circumferential direction.

3. A stator as recited in claim 1 wherein the axial length of said stators is equal to a major portion of the axial length of said position determining pieces.

4. A stator as recited in claim 1 wherein at least two axially spaced arrays of circumferentially spaced, inwardly directed projections are formed on the cylindrical inside surface of said fixed frame.

5. A stator as recited in claim 4 wherein the projections in said at least two axially spaced arrays of projections have axial abutment surfaces which engage corresponding axial abutment surfaces on said position determining pieces in one axial direction and the projection in another one of said at least two axially spaced arrays of projections have axial abutment surfaces which engage corresponding axial abutment surfaces on said position determining pieces in the opposite axial direction.

6. A stator as recited in claim 1 wherein said plurality of position determining pieces are made out of steel plate.

7. A stator as recited in claim 1 wherein each of said first raised portions is slightly shorter in the axial direction than the associated one of said auxiliary poles.

8. A stator as recited in claim 1 wherein each of said second raised portions is slightly shorter in the axial direction than the associated one of said permanent magnets.

9. A stator as recited in claim 1 wherein said auxiliary poles are formed of soft iron.

10. A stator as recited in claim 1 wherein each of said auxiliary poles is firmly attached to the associated one of said permanent magnets.

* * * * *